United States Patent [19]

Yamamoto et al.

[11] Patent Number: 4,824,329
[45] Date of Patent: Apr. 25, 1989

[54] METHOD AND APPARATUS FOR CONTROLLING LIQUID METAL FLOW

[75] Inventors: Hajime Yamamoto; Tadashi Gotou; Masanori Yamakawa; Noboru Nakao, all of Hitachi; Takashi Ikeda, Katsuta, all of Japan

[73] Assignee: Hitachi, Ltd., Tokyo, Japan

[21] Appl. No.: 875,680

[22] Filed: Jun. 18, 1986

[30] Foreign Application Priority Data

Jul. 5, 1985 [JP] Japan ............................... 60-146566
Nov. 29, 1985 [JP] Japan ............................... 60-267156

[51] Int. Cl.$^4$ ........................................... H02K 44/00
[52] U.S. Cl. ......................................... 417/50; 417/53
[58] Field of Search ........................... 417/50, 32, 53; 376/171, 229, 402

[56] References Cited

U.S. PATENT DOCUMENTS

| | | | |
|---|---|---|---|
| 2,658,452 | 11/1953 | Donelian | 417/50 |
| 3,066,607 | 12/1962 | Cole | 417/50 |
| 3,106,058 | 10/1963 | Rice | 417/50 |
| 3,176,919 | 4/1965 | Sparrow | 417/50 |
| 3,275,859 | 9/1966 | Meyerand et al. | 417/50 |
| 3,973,878 | 8/1976 | La Frére | 417/50 |
| 4,294,658 | 10/1981 | Humphreys et al. | 376/171 |
| 4,469,471 | 9/1984 | Keeton et al. | 417/50 |

FOREIGN PATENT DOCUMENTS

| | | | |
|---|---|---|---|
| 35495 | 2/1983 | Japan . | |
| 95975 | 6/1983 | Japan | 417/50 |
| 12853 | 4/1985 | Japan | 417/32 |

OTHER PUBLICATIONS

Davidson et al., "Sodium Electrotechnology at the Risley Nuclear Power Dev. Labs.", *Nuclear Power*, vol. 20, No. 1, Feb. 1981, pp. 79-90.

Primary Examiner—Donald E. Stout
Attorney, Agent, or Firm—Antonelli, Terry & Wands

[57] ABSTRACT

A method comprising the steps of: allowing the directions of a magnetic field, an electric current and the liquid metal flow to perpendicularly intersect to one another; and varying at least one of the magnetic field and the electric current in intensity in response to the temperature of the liquid metal. A force acting on the liquid metal flow is increased and decreased by the interaction between the magnetic field and the electric current. An apparatus for performing the method comprising material varying in electric property with the temperature of the liquid metal. The material is installed in at least one of a path of the magnetic field, a path of the electric current and means for generating the magnetic field. Variation of the electric property of the material allows one of the magnetic field and the electric current to be automatically increased or decreased in intensity in response to the temperature of the liquid metal, so that the force acting on the liquid metal flow is controlled.

14 Claims, 16 Drawing Sheets

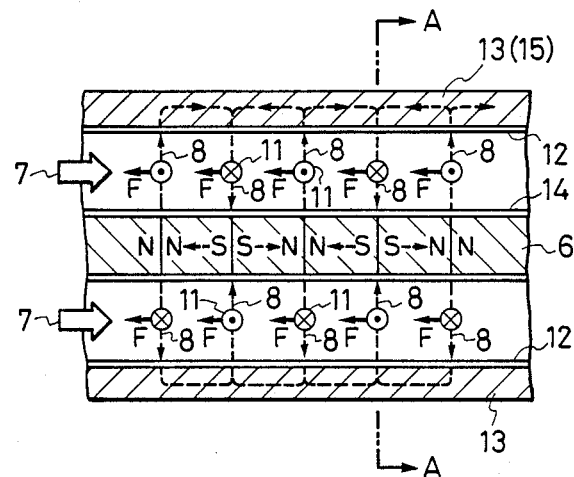
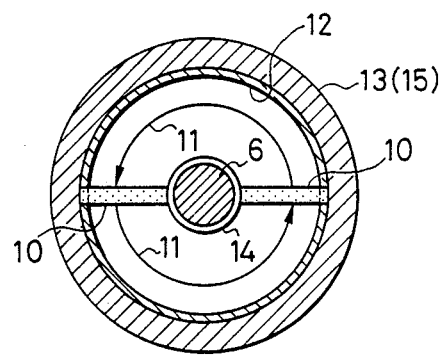
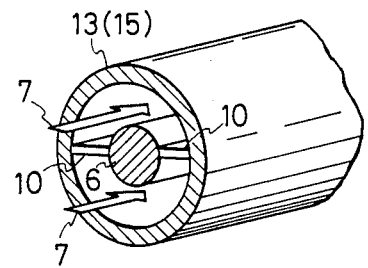

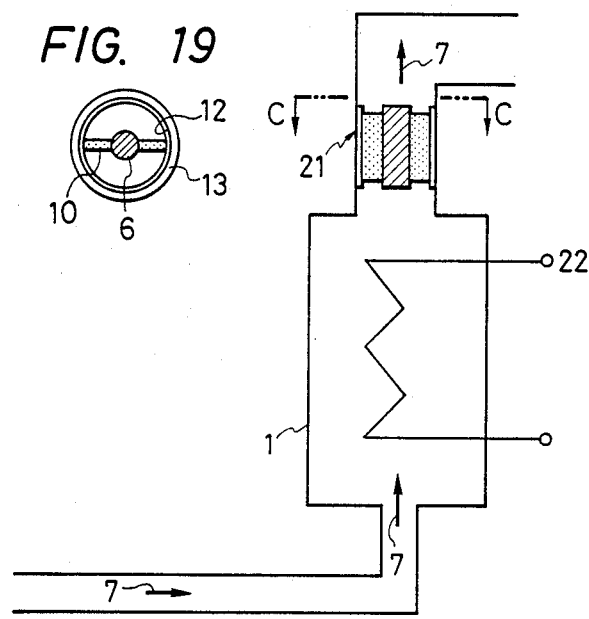

METHOD AND APPARATUS FOR CONTROLLING LIQUID METAL FLOW

BACKGROUND OF THE INVENTION

This invention relates to a method of controlling a liquid metal flow and an apparatus for realizing the method.

There are known an apparatus and a method for applying a drive force to a liquid metal flow comprising the measures that a flow path for liquid metal is located where an electric current perpendicularly intersects a magnetic field, while perpendicularly intersecting both the electric current and the magnetic field. Such an apparatus and a method are disclosed in U.S. Pat. No. 4,469,471 and "Nuclear Energy", Vol. 20, No. 1, Feb. 1981, Pages 79–90.

These publications, however, disclose no operation of applying a braking force to the liquid metal flow which passes through where the electric current perpendicularly intersects the magnetic field, and no operation of releasing the braking force, and no operation of increasing and decreasing the braking force and the driving force which has a direction opposite to that of the braking force. Further, these publications disclose no method of automatically controlling such operations in response to the temperature of the liquid metal, and no apparatus for performing this method.

The liquid metal is very often used for the fast breeder reactor: an example of such a use is disclosed in U.S. Pat. No. 4,294,958. Such a fast breeder reactor comprises a system for discharging the heat in the reactor vessel to the outside, as disclosed in Japanese patent unexmined publication No. 58-35495 (U.S. Ser. No. 295,975). However, it should be noted that this system is required not to discharge the heat in the normal operation state which is in the normal temperature condition. Thus, it is desired to control stopping and starting of the liquid metal flow, which passes through the system, in response to the temperature in the reactor vessel, i.e., the temperature of the liquid metal which receives the heat from the reactor core. This desire has not been achieved in any of the publications described above. In achieving the desire, it is further desired to use no mechanical operation in order to improve the reliability. This additional desire has also not been achieved by the above publications.

SUMMARY OF THE INVENTION

An object of the present invention is to provide a method of applying a braking force to a liquid metal flow and releasing the braking force in response to the temperature variation of the liquid metal with high reliability, and an apparatus for performing this method.

To accomplish the object, the present invention provides a method of controlling a liquid metal flow comprising the steps of: allowing the directions of a magnetic field, an electric current and the liquid metal flow to perpendicularly intersect to one another; and varying at least one of the magnetic field and the electric current in intensity in response to the temperature of the liquid metal, so that a force acting on the liquid metal flow is increased or decreased. The present invention further provides, as an apparatus for performing the method, an apparatus for controlling a liquid metal flow comprising: a liquid metal flow path located where a magnetic field perpendicularly intersects an electric current, while perpendicularly intersecting both the magnetic field and the electic current; means for generating the magnetic field; and material varying in electric property with the temperature of the liquid metal and installed in at least one of a path of the magnetic field, a path of the electric current and the means for generating the magnetic field.

BRIEF DESCRIPTION OF THE DRAWINGS

FIG. 1 is a sectional view of an apparatus for controlling a liquid metal flow according to the third embodiment of the invention, FIG. 2 is a sectional view taken along line A—A in FIG. 1, FIG. 3 is a perspective view of the apparatus shown in FIGS. 1 and 2, FIG. 18 is a schematic sectional view of an apparatus according to a eighth embodiment of the invention, which embodiment includes the third embodiment apparatus installed in the temperature control for the liquid metal, FIG. 19 is a sectional view taken along line C—C in FIG. 18.

DESCRIPTION OF THE PREFERRED EMBODIMENTS

Figure 4:
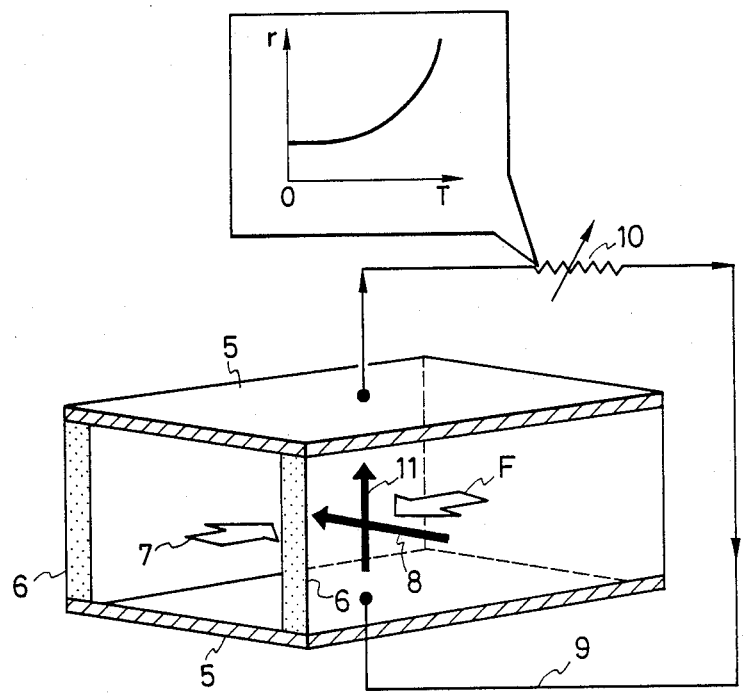
FIG. 4 is a schematic view showing the principle of the invention.

Referring to FIG. 4, two electrode plates 5 are arranged horizontally to face each other and two permanent magnets 6 are arranged upright to define a distance, defining a duct having a rectangular cross section. Liquid metal 7 is supplied so as to flow in the rectangular duct. The direction of the magnetic field 8 generated by the permanent magnets 6 perpendicularly intersects the flow direction of the liquid metal 7. Between the two electrode plates 5 are provided an electric current circuit 9 in which an electric resistor 10 is provided.

Considering the magnetohydrodynamic effect, when the liquid metal 7, electrically conductive fluid, flows perpendicularly across the magnetic field 8, an electric current 11 occurs in the liquid metal 7 and perpendicularly intersects both the magnetic field 8 and the liquid metal flow 7. The intensity of the electric current 11 can be expressed by $$i = \frac{(u \times B)l}{r} \quad (1)$$

where
u: flow velocity (m/s), vector
B: magnetic flux density (W/m$^2$), vector
l: electrode distance (m)
r: resistance in electric circuit ($\Omega$)

On the other hand, when the magnetic field 8 and the electric current 11 are coexistent and perpendicularly intersect to each other in the liquid metal 7, an electromagnetic force F (braking force) acts on the liquid metal according to Fleming's left-hand rule. That is, we obtain $$F = i \times B \quad (2)$$

Substitution of Eq. (1) into Eq. (2) gives $$F = \frac{l}{r}(u \times B) \times B = -\frac{l}{r} B^2 u \quad (3)$$

As can be seen from Eq. (3), the electromagnetic force F acting on the liquid metal is reverse in direction to the liquid metal flow (flow velocity vector), and depends in intensity upon both the magnetic flux density B and the resistance r of the electric current circuit. In other words, a braking force F depending upon the magnetic flux density B and the resistance r ir to act on the liquid metal. Accordingly, in the case where the external driving force acting on the liquid metal is maintained constant, the flow rate of the liquid metal 7 would vary with the above braking force F, i.e., with the resistance r of the electric current circuit and the magnetic flux density B. According to the invention, there is provided in the path for the electric current 11 a resistor 10 having an electric resistance r which varies with the temperature of the liquid metal 7, or there is provided, in a part of the magnetic path, magnetic substance having a magnetic susceptibility which varies with the temperature of the liquid metal 7, to control the braking force F. FIG. 4 shows an embodiment provided, in its electric current circuit, with the resistor 10 having the positive temperature characteristic. In this case, when the liquid metal temperature rises, the electric resistance r becomes larger; the electric current i passing through the electric current circuit 9 is reduced. As the result, the braking force F acting on the liquid metal is reduced; the flow rate is increased. Conversely, when the liquid metal temperature is lowered, the electric resistance becomes small; the electric current is increased. As the result, the braking force F is increased.

Figure 5:
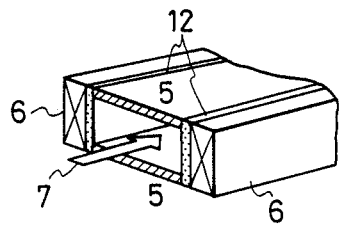
FIG. 5 is a perspective view of a flow path and its vicinity of an apparatus according to the first embodiment of the invention.
Figure 6:
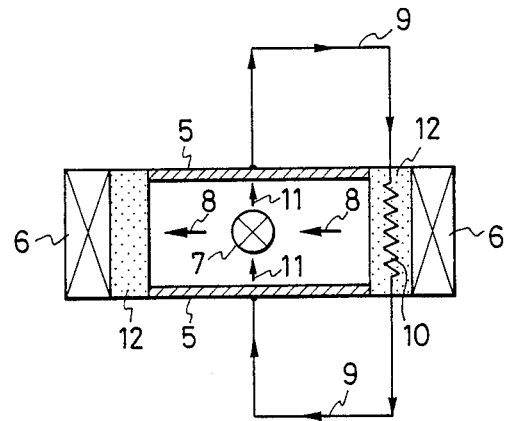
FIG. 6 is a wiring diagram of an electric circuit used for the structure shown in FIG. 5.

There will now be described in detail concrete embodiments utilizing the above phenomena. As shown in FIGS. 5 and 6, the first embodiment of the invention has the two electrode plates 5 arranged horizontally to face each other and two electric insulating walls 12 arranged uptight to define a distance. The liquid metal 7 is supplied so as to flow through the rectangular duct surrounded by the electrode plates 5 and the insulating walls 12. The permanent magnets 6 are arranged outside the insulating walls 12 to that the direct current magnetic field 8 perpendicularly intersects the flow of the liquid metal 7. Between the two electrode plates 5 are provided the electric current circuit 9 in which the electric resistor 10 is provided. The resistor 10 is selected from ones each having an electric resistance r which greatly varies with rise of the temperature T. The resistor 10 is buried in the electric insulating wall 12 which easily gets influence of the temperature of the liquid metal 7, or directly inserted into the liquid metal 7, so as to vary in resistance with the temperature of the liquid metal 7. In the embodiment shown in FIG. 6, the resistor 10 is buried in the insulating wall 12. In this case, when the temperature of the liquid metal 7 rises, the temperature of the electric insulating wall 12 also rises by the heat conduction, and thus the electric resistance of the resistor 10 varies. The facing insulating walls 12 electrically insulate the resistor 10 from the liquid metal 7, and allows all of the electric current generated in the liquid metal 7 to flow perpendicularly across both the magnetic field 8 and the flow of the liquid metal 7 so that the leak current to the surroundings is reduced. With this arrangement, is reduced the current loss which is invalid for generating the braking force.

Figure 7:
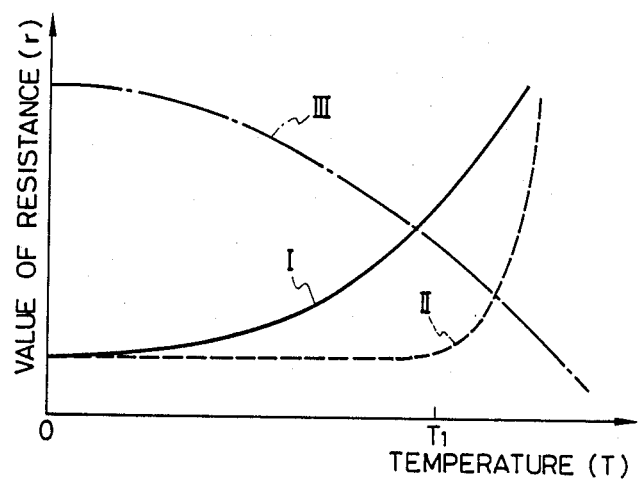
FIG. 7 is a graph showing, in the same graph, three examples of the electric resistance-temperature characteristic curve for the electric resistor shown in FIG. 6.

The resistor 10 is selected, according to its use, from ones having appropriate temperature characteristics. FIG. 7 shows typical temperature characteristic curves for the resistor 10. Referring to FIG. 7, the curves I and II have the positive temperature characteristic, and are thus used for the case where the flow rate of the liquid metal 7 is required to be increased as its temperature rises. Of the two curves, the curve I is used for the case where the flow rate is required to be increased gradually whereas the curve II is used for the case that the flow rate is required not to vary until the temperature reaches a certain temperature $T_1$ but to be rapidly increased beyond the temperature $T_1$. Available materials for the resistor 10 of this type will be shown in Table 1 below; the materials are selected according to the working temperature range.

TABLE 1

| Material | Working Temperature |
|---|---|
| Carbon-containing Teflon | 20–60° C. |
| Balium Titanate | 100–250° C. |
| NiCrFe/Al Alloy | 250° C. or above |

Referring to FIG. 7 again, the curve III has the negative temperature characteristic, and is used for the case where that the flow rate of the liquid metal 7 is required to be decreased as its temperature rises. In other words, the curve III is used for the case where the flow rate of the liquid metal 7 is required to be increased as its temperature is lowered. For example, it is preferable to use the curve III for preventing the treating liquid for the cold trap from freezing. Available materials for the resistor 10 of this type, within the temperature range from the room temperature to 700° C, will be shown in Table 2 below.

TABLE 2

| Material | Working Temperature |
|---|---|
| Ge, Si | Room Temperature–700° C. |
| $Y_3Fe_5O_{12}$ | Room Temperature–400° C. |
| NaCl | 400–700° C. |

Figure 8:
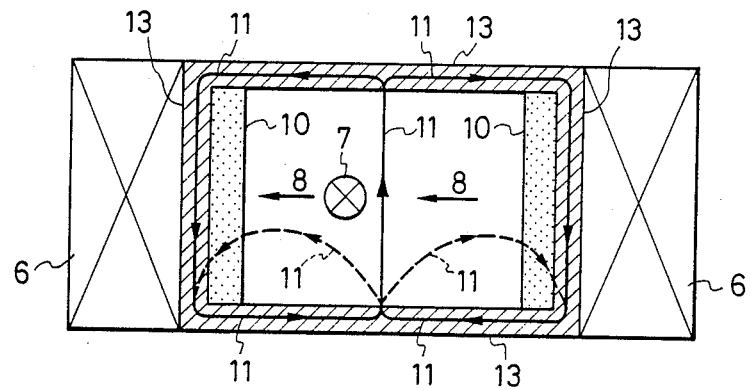
FIG. 8 is a sectional view of an apparatus according to a second embodiment of the invention.

FIG. 8 shows a second embodiment of the invention. In this embodiment, the rectangular duct 13 is made of electrically conductive material through which the electric current 11 can pass. The electric resistors 10 are installed on the inner surfaces of the duct 13. The liquid metal 7 flows in the rectangular duct 13 while being in contact with the resistors 10. The permanent magnets 6 are arranged at both outsides of the rectangular duct 13 so that the magnetic field 8 perpendicularly intersects the flow of the metal liquid 7. As the result, the electric current 11 is generated in the liquid metal as in the previous embodiment, and thus the braking force F acts on the liquid metal in the direction opposite to that of the liquid metal flow. The resistors 10 are selected from ones which sensitively vary in electric resistance with the temperature variation. For example, there will now be described the case of using the resistor which becomes lower in resistance as the temperature rises. When the temperature is low, the resistor 10 has a high electric resistance and thus serves as an electric insulating wall of a sort. Accordingly, the electric current 11 generated in the liquid metal 7 passes straight up through the liquid metal 7 as indicated by a solid line arrow in FIG. 8, and circulates through the electric current circuit including the duct 13. In this case, since all of the electric current in the liquid metal 7 perpendicularly intersects the magnetic field 8, the braking force F is large. In contrast, when the temperature of the liquid metal 7 becomes high, the electric resistance of the resistors 10 are lowered; the resistors 10 are changed to electrically conductive walls. Accordingly, the electric current 11 generated in the liquid metal 7 flows not vertically as indicated by broken line arrows, and gets into the side walls in its midway. As the result, the electric current component transversely intersecting the magnetic field 8 is reduced; the braking force F is attenuated. Conversely, using a resistor which is increased in resistance as the temperature rises, the flow rate can be reduced as the temperature rises. With this embodiment, the duct 13 serves as the electric current circuit as well; the compact apparatus is expected. In this embodiment, since the resistors 10 are in direct contact with the liquid metal 7, it is perferable, in the case of usinng corrosive liquid metal such as sodium, to cover the surfaces of the resistors 10 with thin metal foils or to plate the surfaces of the resistors 10 with nickel metal or the like by vapor deposition.

FIGS. 1, 2 and 3 show a third embodiment, in which a cylindrical duct 13 includes at its center permanent magnets 6. The permanent magnets 6 are arranged end to end with opposite magnetic poles being in contact with each other, and such an assembly is housed in the cylindrical pipe 14 made of stainless steel. The cylindrical pipe 14 is arranged on the central axis of the duct 13. The duct 13 is made of ferromagnetic material 15. The lines of magnetic force in this embodiment go out radially outwardly from the N poles in the cylindrical pipe 14 toward the duct 13 as indicated by broken lines, get into the wall of the duct 13 and thereafter go back radially inwardly toward the S poles in the cylindrical pipe 14 again. Since the magnetic poles of the permanent magnets are arranged (NN), (SS), (NN), ..., the magnetic field 8 goes out radially outwardly from the cylindrical pipe 14 or goes back radially inwardly toward the cylindrical pipe 14; the intensity of the magnetic field is a sum of the intensities of the magnetic fields derived from the respective pairs of the adjacent magnets. Between the duct 13 and the cylindrical pipe 14 are installed resistors 10 which vary in resistance with the temperature of the liquid metal 7. The liquid metal 7 flows through the annular flow path surrounded by the duct 13 and the cylindrical pipe 14. Since the magnetic field 8 goes out radially outwardly or goes back radially inwardly as shown in FIG. 8, the magnetic field perpendicularly intersects the flow of the liquid metal 7. As the result, loop-like electric currents 11 are generated in the liquid metal 7 and perpendicularly intersect the magnetic field 8. The interaction between the electric current 11 and the magnetic field 8 allows the braking force F to act on the liquid metal 7.

In this embodiment, the resistors 10 which are increased in resistance as the temperature rises are provided in a part of the path through which the loop current 11 passes. With this arrangement, the resistors 10 are increased in resistance as the temperature of the liquid metal 7 rises, and thus the current 11 is reduced; the braking force F can be reduced. The converse control can be also done. If the loop current 11 in the embodiment gets into the duct wall 13 and passes through it, the braking force F acting on the liquid metal would be unfavorably reduced. To obviate this problem, the electric insulating wall 12 is installed on the inner surface of the duct 13 so that the current 11 in the liquid metal 7 does not get into the duct 13. Using the embodiment, since the apparatus is made cylindrical, it is easy to install the apparatus to cylindrical equipments such as pipe lines. Further, since the permanent magnet 6 is housed in the ferromagnetic duct 13 and thus the duct itself constitutes a part of the magnetic circuit, the embodiment has the advantage of a small extent of the leak magnetic field to the outside.

Figure 9:
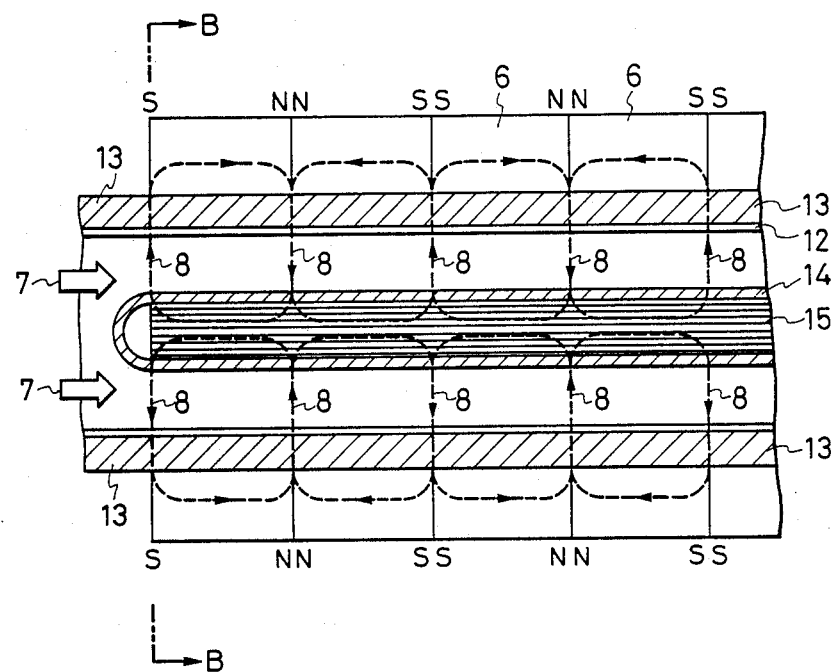
FIG. 9 is a sectional view of an apparatus according to a fourth embodiment of the invention.
Figure 10:
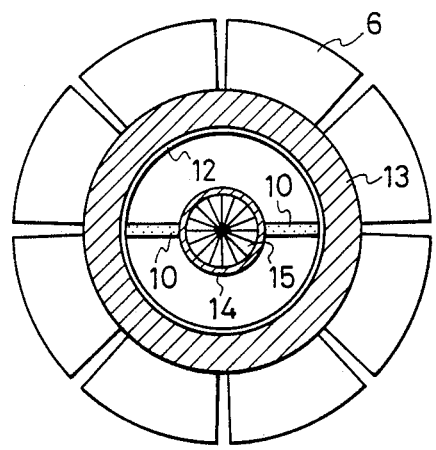
FIG. 10 is a sectional view taken along line B—B in FIG. 9.

FIGS. 9 and 10 show a fourth embodiment, in which permanent magnets 6 are arranged outside a duct 13, and a ferromagnetic member 15 is arranged in the center of the duct 13. The permanent magnets 6 are arranged axially of the duct 13 with the opposite magnetic poles being in contact with each other like (NN, SS, NN,...). The ferromagnetic member 15 arranged in the center of the duct is radially laminated and housed in a cylindrical pipe 14 as shown in FIGS. 9 and 10. The cylindrical pipe 14 and the duct 13 are made of materials having a high magnetic permeability such as stainless steel or the like. The direction of the magnetic field 8 is defined as indicated by broken line arrows, like the previous embodiment (FIG. 1). However, it is noted that the lines of the magnetic force go out from the N poles of the outer permanent magnets, pass through the duct, pass perpendicularly across the liquid metal, and get into the central ferromagnetic member 15. The reason why the ferromagnetic member 15 is radially laminated is that the magnetic field 8 in the liquid metal 7 easily goes out radially outwardly. The resistors 10 are installed between the duct 13 and the central cylindrical pipe 14, as in the previous embodiment (FIG. 1). The liquid metal 7 is supplied so as to flow through an annular flow path surrounded by the duct 13, the central cylindrical pipe 14 and the resistors 10. The controlling mechanism for the braking force F is similar to those of the previous embodiments. Since the permanent magnets 6 are arranged outside the apparatus, the permanent magnets in this embodiment are easily assembled and repaired.

Figure 11:
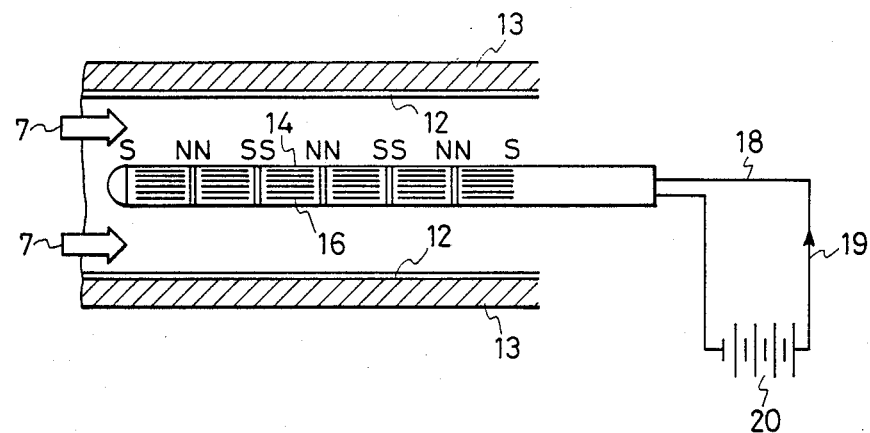
FIG. 11 is a sectional view of an apparatus according to a fifth embodiment of the invention.
Figure 12:
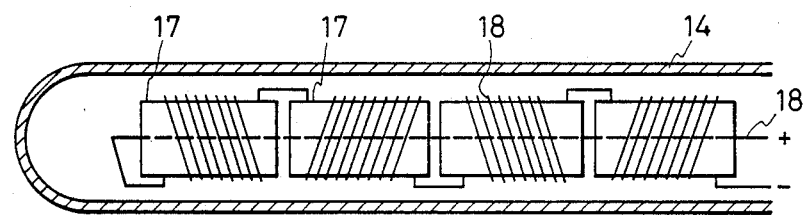
FIG. 12 is a detailed sectional view of the central structure shown in FIG. 11.
Figure 13:
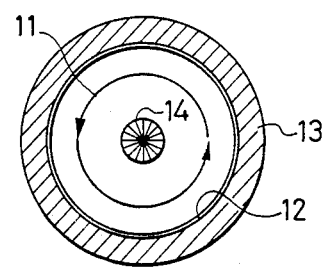
FIG. 13 is a transverse sectional view of the apparatus shown in FIG. 11.

FIGS. 11, 12 and 13 show a fifth embodiment, in which electromagnets are used in place of the permanent magnets. The constitution and operation of this embodiment are substantially similar to those of the embodiment shown in FIG. 1. The duct 13 is made of ferromagnetic material, the electromagnets 16 are arranged in the center of the duct 13. The electromagnets 16 are so constructed that iron cores 17 are disposed with equal distances and a coil 18 is wound around the iron cores 17. Winding directions are varied alternately conversely so that magnetic poles are so produced at the iron cores 17 that the opposite magnetic poles face each other in such a manner as (NN, SS, NN, SS, ...). The coil 18 is surrounded by a cylindrical pipe 14 made of stainless steel. The coil 18 is made of material which sensitively varies in resistance with variation of the ambient temperature. A direct current source 20 is used as the exciter. With all of the arrangement, when the temperature of the liquid metal 7 rises and thus the ambient temperature near the coil rises, the resistance of the coil becomes high; the exciting current 19 is reduced. Accordingly, the intensity of the magnetic field, i.e., the magnetic flux density is reduced to decrease the braking force F. The converse control can be also done. Since the temperature-sensitive resistor is used for the exciting coil itself, this embodiment offers the advantage of a simple structure.

Figure 14:
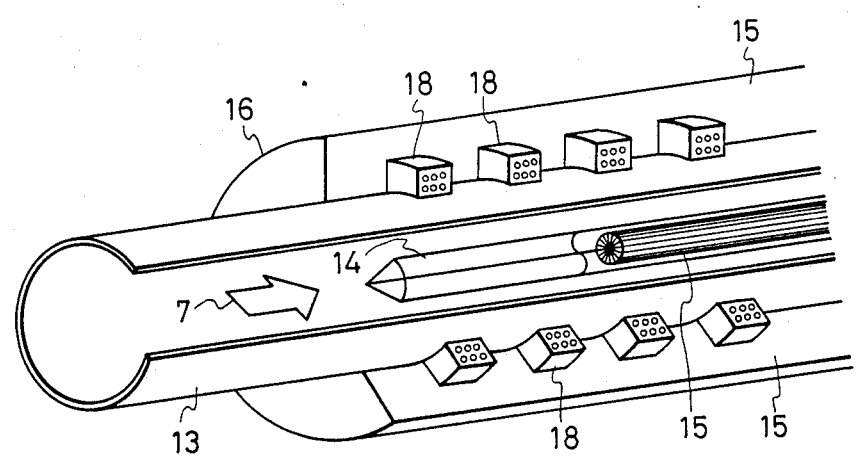
FIG. 14 is a perspective and partially broken view of an apparatus according to a sixth embodiment of the invention.
Figure 15:
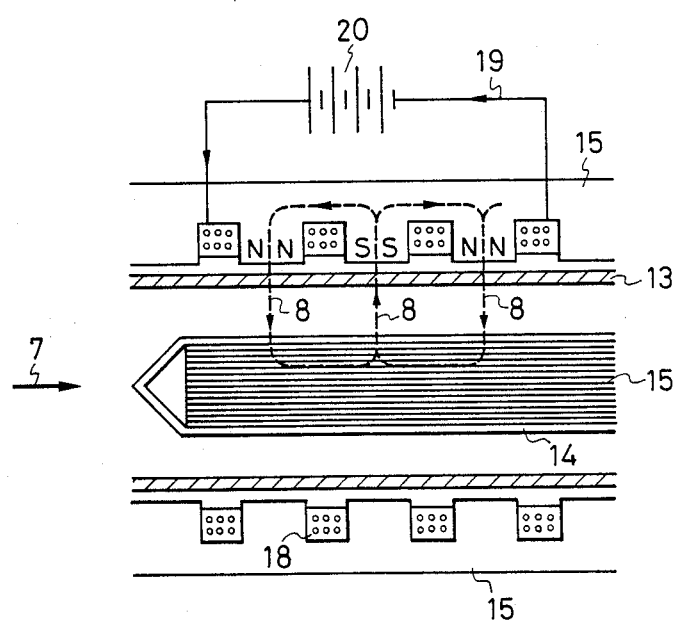
FIG. 15 is a total sectional view of the apparatus shown in FIG. 14.

FIGS. 14 and 15 show a sixth embodiment, in which an electromagnet 16 is used in place of the permanent magnets of the embodiment shown in FIG. 10. A ferromagnetic member 15 is arranged outside the duct 13, and a coil 18 is wound inside the ferromagnetic member 15. Stating in detial, the ferromagnetic member 15 has comb-like longitudinal section. The coil 18 is inserted into the recesses of the comb-like section and wound around the duct 13, so that the magnetic field 8 easily gets into the inside of the duct 13 radially from the projections of the comb as indicated by broken line arrows in FIG. 16. It should be noted that the ferromagnetic member 15 has no recesses at the transverse section, so that there is obtained a uniform circumferential distribution of the magnetic field in the duct 13. On the center axis of the duct 13 is arranged a cylindrical pipe 14 as in the embodiment shown in FIG. 6. In the cylindrical pipe 14 is housed the ferromagnetic member 15 which is radially laminated. The coil 18 is made of material which sensitively varies in resistance with the temperature. When the temperature of the liquid metal 7 rises, the resistance of the coil 18 becomes high; the exciting current 19 is reduced, as in the embodiment shown in FIG. 8. Accordingly, the intensity of the magnetic field 8 is reduced to decrease the braking force. The converse control can be also done.

Figure 16:
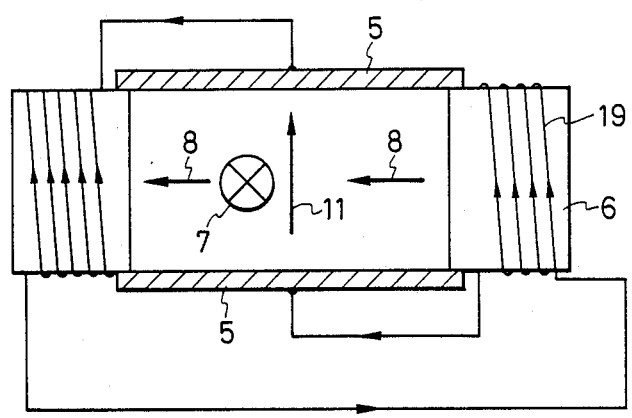
FIG. 16 is a sectional view of an apparatus according to a seventh embodiment of the invention.
Figure 17:
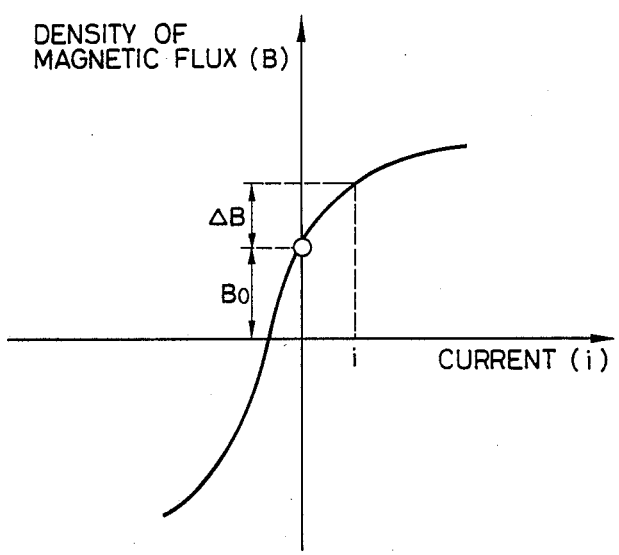
FIG. 17 is a graph showing the relationships between the electric current flowing through the coil and the magnetic flux density of the magnet shown in FIG. 16.

FIG. 16 shows a seventh embodiment, in which two electrically conductive electrode plates 5 are arranged horizontally to face each other, and two permanent magnets 6 are arranged upright to define a distance. The two electrode plates 5 are connected to each other through one coil 19, a part of which is wound around the permanent magnets 6. The coil 19 is made of material which sensitively varies in resistance with the temperature. In this embodiment, the magnetic flux density B of the magnetic field 8 in the liquid metal 7 is a sum of that caused by the permanent magnets 6 and that caused by an electromagnet 6, the latter occuring when the electric current passes through the coil 19. In general, where the coil is wound around the permanent magnets and the current i passes through the coil, the magnetic flux density B varies as shown in FIG. 17. When the current i is zero, the magnetic flux density B is caused by the permanent magnets only. As the current i passes, the magnetic flux density B is increased by $\Delta B$.

In the embodiment shown in FIG. 16, when the temperature of the liquid metal 7 rises, the temperature of the coil wound around the permanent magnets 6 rises; the electric resistance of the coil becomes high. Accordingly, the current i passing through the coil 19 is reduced; the increment $\Delta B$ of the magnetic flux density is also reduced. As can be seen from Eq. (2), when both the current i and the magnetic flux density B are reduced simultaneously, the braking force F is rapidly reduced as compared with the case where one of the current and the magnetic flux density is reduced. In other words, since this embodiment utilizes the synergetic effect of the current i and the magnetic flux density B, the high responsibility is expected for the flow rate control in response to the temperature variation of the liquid metal.

The above-described embodiments involve the case of using the resistor which varies in resistance with the temperature of the liquid metal, i.e., the electric current in the liquid metal varies with the temperature of the liquid metal. On the other hand, there can be considered embodiments of another type in which it is the magnetic flux density B that varies with the temperature. The embodiment of this type is provided by putting, into a part of the magnetic circuit including the liquid metal, substance having a magnetic property, one of electric properties, which varies with the temperature. For example, the permanent magnet 6 in the embodiment shown in FIGS. 5 and 6 may be made of material which varies in coercive force with the temperature, such as $MnFe_2O_4$, $CoFe_2O_4$, Ni, Co or the like. Further, there may be provided substance which sensitively varies in magnetic susceptibility with the temperature in place of the ferromagnetic member 15 arranged in the center of the duct 13 shown in FIGS. 9 or 12. With both types above, the intensity of the magnetic flux density B passing perpendicularly across the liquid metal varies with the temperature of the liquid metal; the braking force can be controlled.

As a matter of course, the substance which varies in magnetic property with the temperature of the liquid metal 7 may be provided in the magnetic circuit in addition to the measures that a resistor which varies in resistance with the temperature of the liquid metal is provided in the electric current circuit. In this case, there is expected a flow rate control apparatus having a high responsibility based on the synergetic effect of the electric current and the magnetic field as previously described.

FIGS. 18 and 19 show an example, in which the flow control apparatus of the third embodiment is installed in a heating equipment for the liquid metal 7. The flow control apparatus 21 is installed in the outlet pipe of the heating equipment 1. A heater 22 of the heating equipment 1 heats the liquid metal 7. When the liquid metal temperature at the outlet of the heating equipment 1 rises because of certain abnormality, the electromagnetic braking force by the flow control apparatus 21 is reduced to increase the flow rate of the liquid metal. Accordingly, there is avoided any malfunction caused by overheating of the liquid metal. The flow control apparatus 21 may be replaced by another one selected from the other embodiments.

Figure 20:
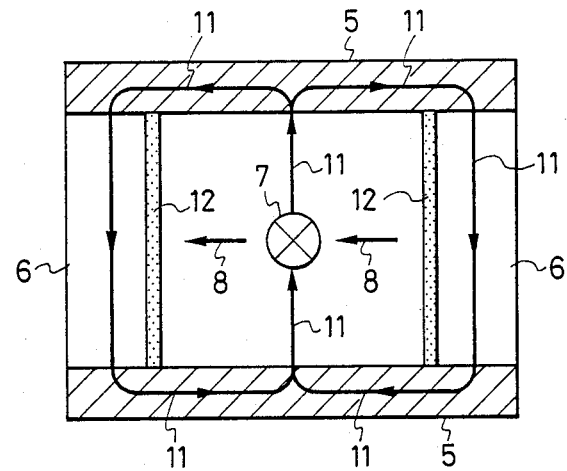
FIG. 20 is a sectional view of an apparatus according to a ninth embodiment of the invention.
Figure 21:
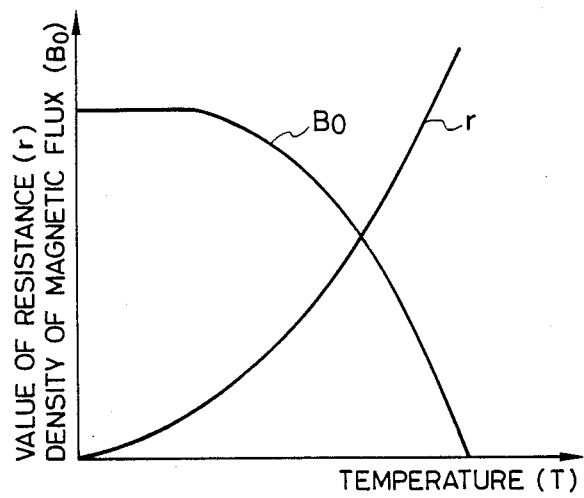
FIG. 21 is a graph showing variations, with the temperature, of the electric resistance and the coercive force of the magnet for the apparatus shown in FIG. 20.

FIG. 20 shows a ninth embodiment, in which permanent magnets 6 are arranged upright to define a distance and installed between two electrically conductive electrode plates 5. Electric insulating walls 12 are installed on the inner surfaces of the permanent magnets 6. Liquid metal 7 flows perpendicularly to the drawing sheet. The permanent magnet 6 is made of material having a coercive force $B_0$ which is reduced as the temperature rises, and having a electric resistance r which is increased as the temperature rises, as shown in FIG. 21. Referring to FIG. 21, when the temperature is held low, the coercive force $B_0$ is high and the resistance is low; the value i of the generated current 11 is large. Accordingly, the electromagnetic braking force F is large. On the other hand, as the temperature of the liquid metal 7 becomes higher, the coercive force $B_0$ becomes lower and the resistance becomes higher (the electric current value i becomes smaller); the braking force F becomes smaller. Thus, the use of the substance varying simultaneously in both coercive force $B_0$ and resistance r allows the apparatus to be very simple in structure. Such a substance can be obtained, for example, by substituting lead (Pb) for titanium (Ti) of barium titanate ($BaTiO_3$).

A tenth embodiment is used for the cooling equipment for sodium of the fast breeder reactor which utilizes liquid metal as the coolant. This embodiment will now be described by referring to FIGS. 22 to 25.

Figure 22:
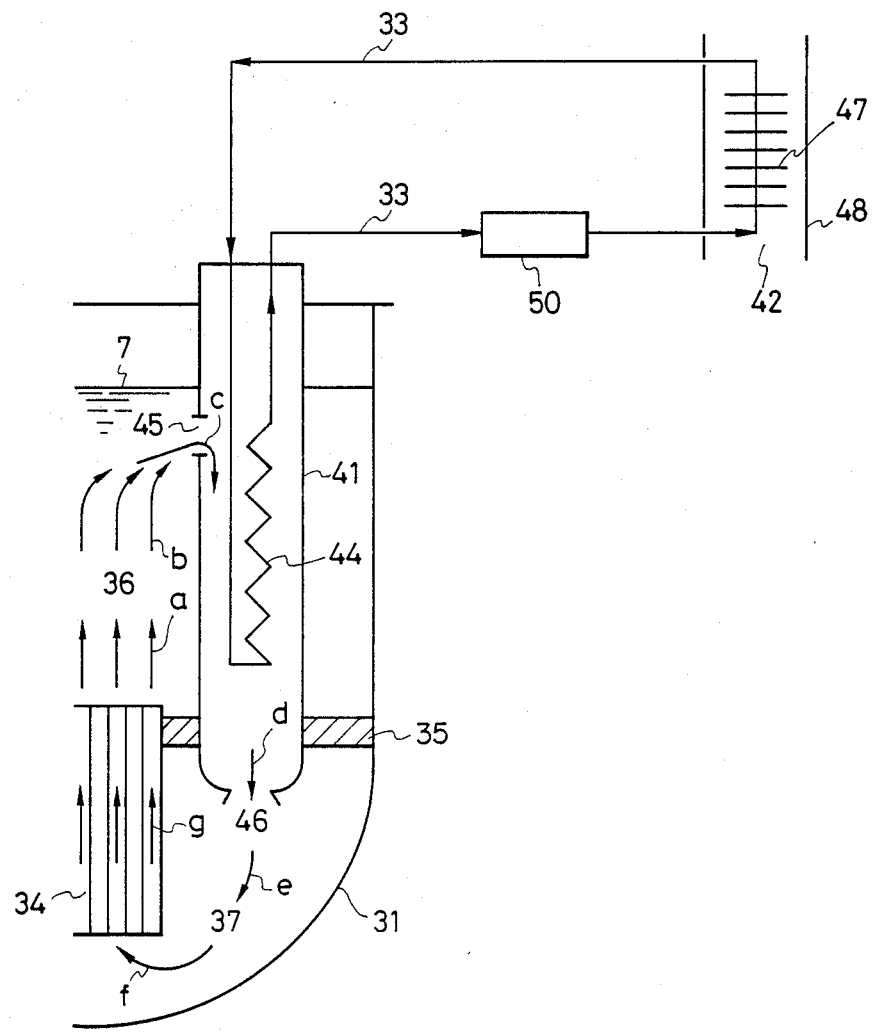
FIG. 22 is a sectional view of a cooling equipment for sodium used in the reactor core in the case where a tenth embodiment apparatus is used for the fast breeder reactor.

Referring to FIG. 22, the reactor vessel 31 of the fast breeder reactor is filled with the liquid metal 7. A reactor core 34 including nuclear fuel is arranged at the center of the reactor vessel 31. The reactor vessel 31 is divided by a horizontal partition 35 into two parts: an upper plenum 36 and a lower plenum 37.

A heat exchanger 41 is installed in the reactor vessel 31 and passes through the horizontal partition 35. The inlet 45 of the heat exchanger 41 opens at the upper plenum 36 whereas the outlet 46 thereof opens at the lower plenum 37. The heat-transfer pipe 44 of the heat exchanger 41 is connected to a pipe line 33 which is connected to a radiating fin pipe 47 housed in a barrel 48 of an air cooler 42. The pipe line 33 is liquid-tightly filled with liquid sodium-potassium alloy (NaK) 55 as the liquid metal. The pipe line 33 is provided with an electromagnetic pump 50 for controlling the flow of the liquid NaK 55.

Figure 24:
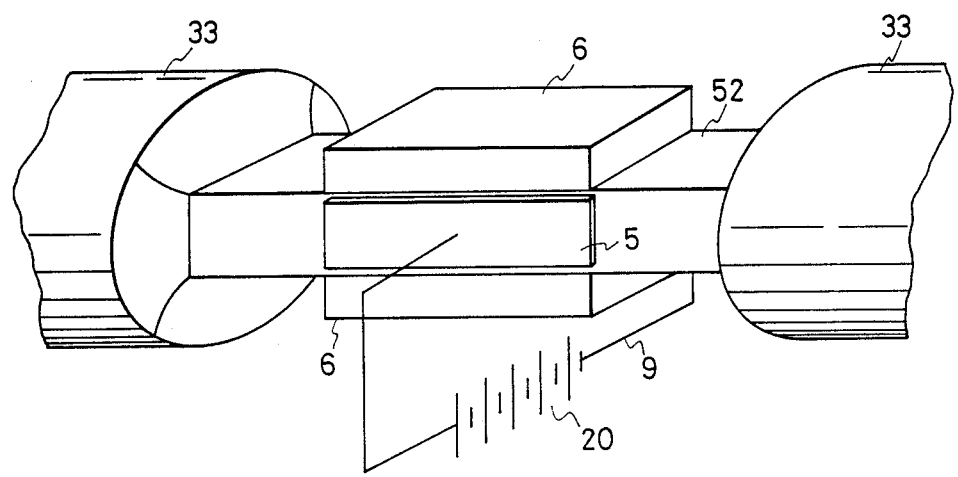
FIG. 24 is a perspective view of the electromagnetic pump shown in FIG. 22.
Figure 25:
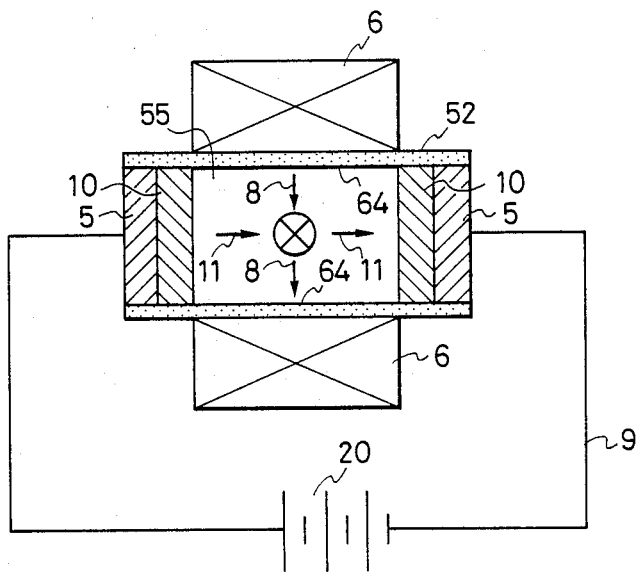
FIG. 25 is a sectional view of the electromagnetic pump shown in FIG. 24.
Figure 26:
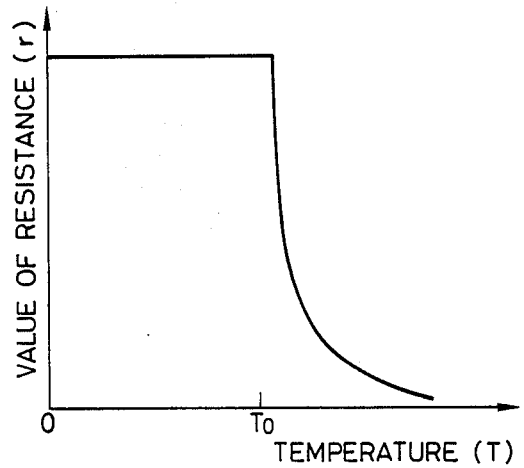
FIG. 26 is a graph showing the relationships between the electric resistance and the temperature of the electric circuit of the electromagnetic pump shown in FIG. 25.
Figure 27:
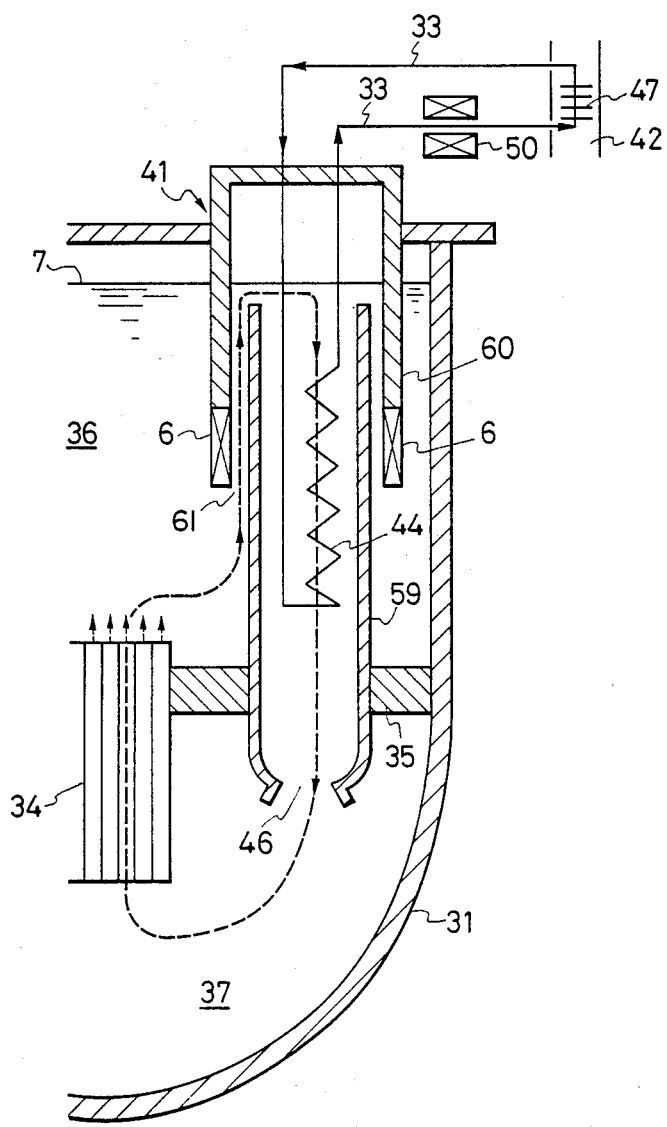
FIG. 27 is a sectional view of a cooling equipment for sodium used in the reactor core in the case that the eleventh embodiment apparatus is used for the fast breeder reactor.
Figure 28:
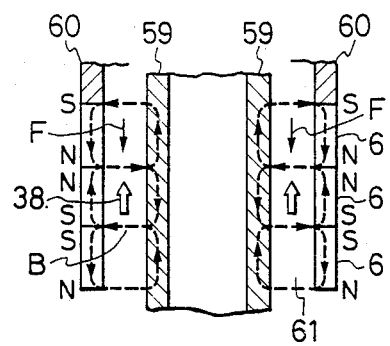
FIG. 28 is a detailed view of the electromagnetic brake portion shown in FIG. 27.

The constitution of the electromagnetic pump 50 will now be described below. Referring to FIGS. 24 and 25, the flow of the liquid NaK 55 is surrounded by upright electric resistors 10 and horizontal duct plates 52. Electrodes 5 are arranged outside and in contact with the resistors 10, and permanent magnets 6 are arranged outside the duct plates 52. An electric power source 20 is connected to an electric current circuit 9 which connects the electrodes 5 to each other. The electric resistor 10 has such a resistance (r) - temperature (T) characteristic that the resistance r is rapidly reduced when the temperature exceeds $T_0$ as shown in FIG. 26. Material having such a characteristic is, for example, bismuth (Bi).

Figure 23:
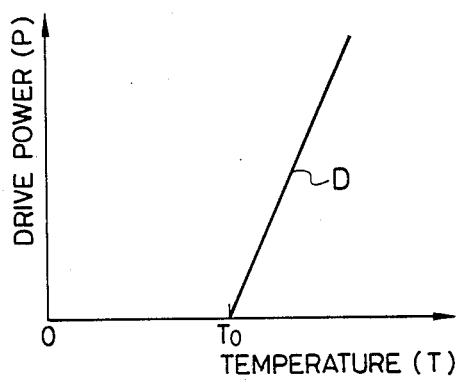
FIG. 23 is a graph showing the driving force-temperature characteristics of the electromagnetic pump shown in FIG. 22.

With this arrangement, if the temperature of the liquid metal 7 in the reactor vessel 31 is normal, i.e., not above $T_0$ (540° C), the temperature of the liquid NaK 55 in the pipe line 33 is also under $T_0$, because the heat of the liquid metal 7 is transferred through the heat-transfer pipe 44 to the liquid NaK 55 in the pipe line 33. Accordingly, the temperatures of the resistors 10 which are in contact with the liquid NaK 55 are also under $T_0$; the resistances r of the resistors 10 remain very high. Thus, the electric current from the electric power source 20 can not pass through the resistor 10 beyond the electrode 5, and therefore does not flow into the liquid NaK 55. As the result, no electric current perpendicularly intersecting the magnetic field 8 exists; no driving force P toward the air cooler 42 acts on the liquid NaK 55. The driving force P remains zero in the temperature range between 0 and $T_0$ as shown in FIG. 23.

In contrast, if the liquid metal 7 is overheated by the reactor core 34, the temperature of the liquid metal 7 exceeds $T_0$ and the temperature of the liquid NaK 55 in the pipe line 33 also exceeds $T_0$. Accordingly, the temperatures of the resistors 10 which are in contact with the liquid NaK 55 also exceed $T_0$; the resistances r of the resistors 10 are remarkably reduced. Thus, the electric current from the electric power source 20 passes through the electrodes 5 and the resistors 10, and flows into the liquid NaK 55 while perpendicularly intersecting the magnetic field 8. As the result, the electromagnetic pump 50 allows the driving force P to act on the liquid NaK 55 toward the air cooler 42. This driving force P is rapidly increased as indicated by the line D in FIG. 23.

In the latter condition, the liquid metal 7 circulates in the reactor vessel 31 as indicated by arrows a, b, c, d, e, f and g, and receives the heat, which is transferred through the heat-transfer pipe 44 to the liquid NaK 55 and discharged through the radiating fin pipe 47 of the air cooler 42 to the outside of the reactor vessel 31. Accordingly, the liquid metal 7 is reduced in temperature, and discharged from the outlet 46 into the lower plenum 37 and passes through the reactor core 34 to circulate again. This circulation allows the overheated reactor core 34 to be cooled to secure safety.

Figure 29:
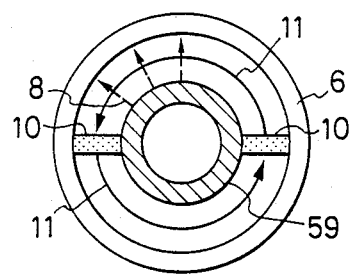
FIG. 29 is a horizontal sectional view of the structure shown in FIG. 28.
Figure 30:
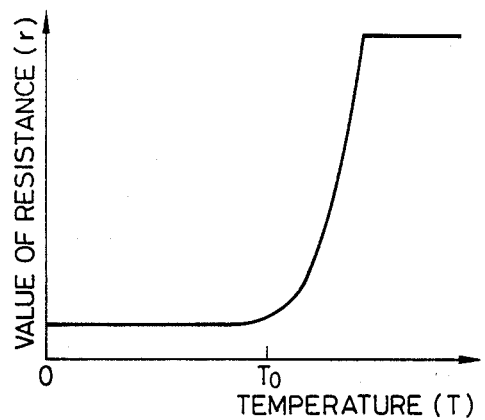
FIG. 30 is a graph showing the electric resistance-temperature characteristic curve of the electric resistor shown in FIG. 29.

FIGS. 27 to 30 show an eleventh embodiment of the invention. The reactor vessel 31 of the fast breeder reactor includes therein a heat exchanger 41, which has an inner cylinder 59 passing through a partition 35, and an outer cylinder 60 arranged to surround the upper portion of the inner cylinder 59 to define an annular inlet 61. Magnets 6 are installed on the lower end of the outer cylinder 60. Between the magnets 6 and the inner cylinder 59 are installed electric resistors 10 (see FIGS. 28 and 29). FIG. 30 shows the resistance (r)-temperature characteristic curve for the resistor 10. In this embodiment, an electromagnetic pump 50 installed in a pipe line 33 may have any known structure. The resistor 10 may be made of barium titanate ($BaTiO_3$) or NiCrFe-/Al alloy.

In this embodiment, when the temperature of the liquid metal 7 is $T_0$ or under, the temperatures of the resistors 10 are also $T_0$ or under; their resistances are very low. In this condition, when the liquid metal 7 receives the heat from the reactor core 34 and flows up through the inlet 61 into the heat exchanger 41 as indicated by arrows 38 in FIG. 28, a loop-like current 11 is generated in the inlet 61 and circulates through the resistors 10 as shown in FIG. 29. Thus, the electric current 11 perpendicularly intersects the magnetic field 8 caused by the magnets 6. The interaction between the electric current 11 and the magnetic field 8 allows a braking force F which is opposite in direction to the arrows 38 to act on the liquid metal 7 in the inlet 61, resulting in no liquid metal flow into the inner cylinder 59 and thus no cooling of the liquid metal. In contrast, when the liquid metal 7 is overheated to a temperature above $T_0$; their resistances become very high. In this condition, the electric current 11 in the inlet 61 is interrupted by the resistors 10; the loop-like circulating current 11 disappears. Accordingly, the generation of the braking force is suppressed; the overheated liquid metal 7 flows through the inlet 61 into the inner cylinder 59 to be heat-exchanged with the liquid NaK in the heat-transfer pipe 44. The heated liquid NaK is driven by the electromagnetic pump 50 and fed to the air cooler 42 to discharge the heat to the outside of the reactor vessel 31. On the other hand, the cooled liquid metal 7 flows through the outlet 46 into the lower plenum 37 and thereafter passes through the reactor core 34 into the upper plenum 36 to complete circulation. The circulation of the liquid metal 7 through the reactor core 34 cools the reactor core to secure safety. Since the resistors 10 of this embodiment more easily receive the heat than those of the tenth embodiment, high responsibility is expected.

Figure 31:
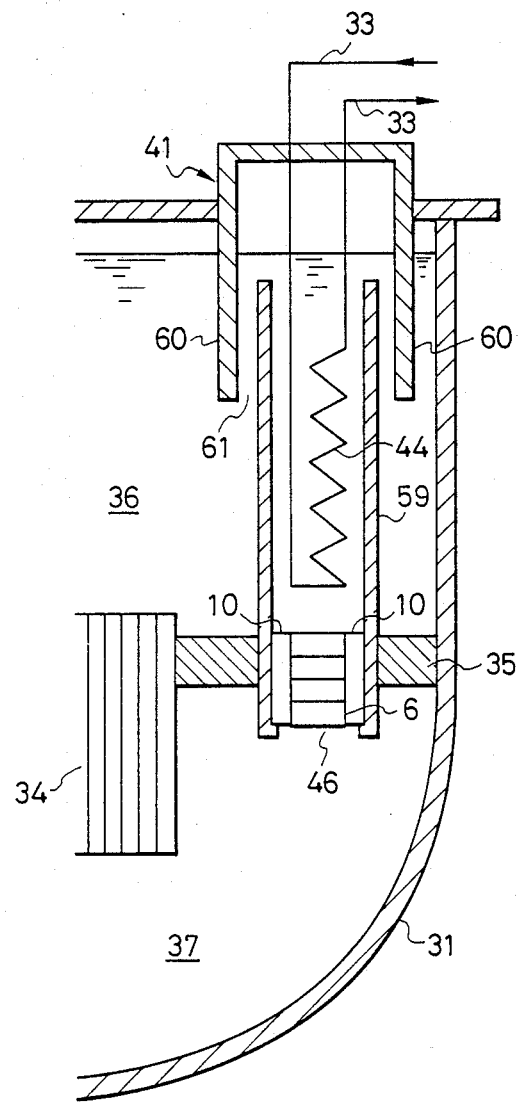
FIG. 31 is a sectional view of a cooling equipment for sodium used in the reactor core in the case where a twelfth embodiment apparatus is used for the fast breeder reactor.
Figure 32:
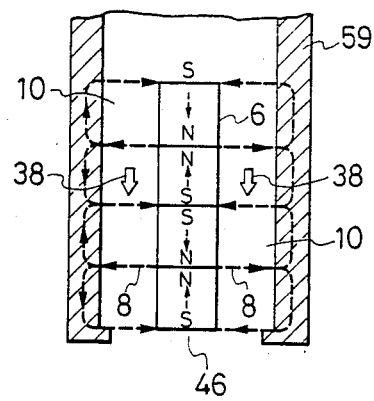
FIG. 32 is a detailed view of the electromagnetic brake portion region shown in FIG. 31.
Figure 33:
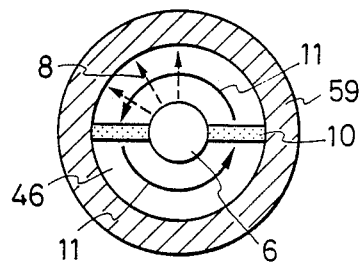
FIG. 33 is a horizontal sectional view of the structure shown in FIG. 32.

FIGS. 31 to 33 show a twelfth embodiment of the invention. The reactor vessel 31 of the fast breeder reactor includes therein a heat exchanger 41, which has an inner cylinder 59 passing through a partition 35, and an outer cylinder 60 arranged to surround the upper portion of the inner cylinder 59 to define an annular inlet 61. Magnets 6 are installed at the center of the outlet 46 of the inner cylinder 59 which includes therein the heat-transfer pipe 44 as shown in FIGS. 32 and 33. Between the magnets 6 and the inner surface of the inner cylinder 59 are installed electric resistors 10. The resistance (r)-temperature characteristic curve for the resistor 10 of this embodiment is similar to that shown in FIG. 30.

In this embodiment, when the liquid metal 7 which is above $T_0$ in temperature flows through the inlet 61 into the inner cylinder 59 and flows out from the outlet 46 as indicated by arrows 38 in FIG. 32, the temperatures of the resistors 10 become also above $T_0$; their resistances become high. Thus, the electric current 11 generated by the flow indicated by the arrows 38 is interrupted by the resistors 10; no braking force is produced. As the result, the liquid metal 7 flows through the heat exchanger 41 to be cooled. The cooling means and its operation are similar to those of the eleventh embodiment.

In contrast, when the liquid metal 7 which is $T_0$ or under in temperature flows through the outlet 46 as indicated by the arrows 38, the temperatures of the resistors 10 become also $T_0$ or under; their resistances become very low. Thus, the electric current 11, which is generated by the liquid metal 7 passing through the magnetic field 8 of the magnets 6, passes through the resistors 10 and circulates in a loop-like manner. The interaction between the loop-like current 11 and the magnetic field 8 allows the braking force F to be generated against the flow indicated by the arrows 38; the flow of the liquid metal 7 through the heat exchanger 41 is suppressed. Thus, when the temperature is $T_0$ or under, the overcooling of the liquid metal 7 is avoided.

Figure 34:
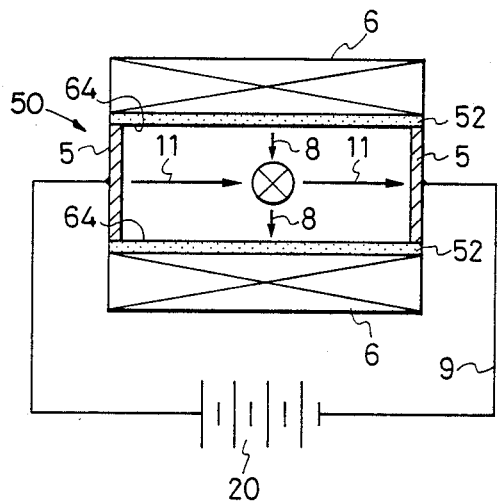
FIG. 34 is a sectional view of an electromagnetic pump according to a thirteenth embodiment of the invention.

FIG. 34 shows a thirteenth embodiment of the invention. This embodiment is similar to the tenth embodiment except the feature that the electromagnetic pump 50 of the tenth embodiment is modified in constitution, and the liquid metal with which the pipe line 33 of the tenth embodiment is filled is changed in kind.

Figure 35:
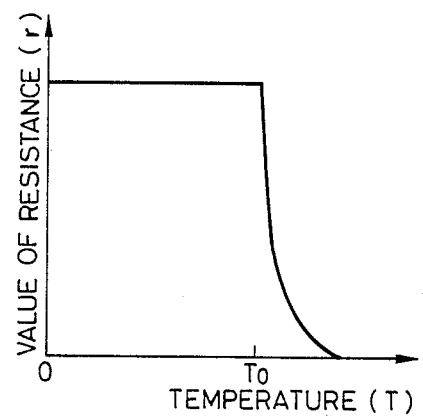
FIG. 35 is a graph showing the relationships between the electric resistance and the temperature of the liquid metal which passes through the electromagnetic pump shown in FIG. 34.

The constitution of the electromagnetic pump 50 will be described below. Two duct plates 52 are arranged horizontally to face each other and two electrodes 5 are arranged upright to define a distance between the duct plates 52, defining a duct for the liquid flow. The duct is connected to the pipe line 33. Two permanent magnets 6 are installed on both outsides of the duct plates 52. The electrodes 5 are connected to an electric power source 20 through an electric current circuit 9. The liquid metal with which the pipe line 33 is filled is selected from materials presenting the resistance (r)-temperature characteristic curve shown in FIG. 35: when the temperature exceeds $T_0$ the resistance r is rapidly reduced. Such a liquid metal may be alloys of bismuth (Bi), antimony (Sb), Indium (In) and the like. Of course, there may be used other pure metals presenting the similar characteristic.

In this embodiment, whether or not the electric current from the electric power source 20 passes through the liquid metal in the duct is determined by the condition of the liquid metal in the duct. When its temperature is above $T_0$, the electric current 11 passes through the duct while perpendicularly intersecting the magnetic field 8 caused by the magnets 6, allowing the driving force P to be generated to act on the liquid metal in the duct to cool the liquid metal 7 in the reactor vessel 31. In contrast, when the temperature is under $T_0$, the liquid metal in the duct presents a high electric resistance as seen from the characteristic curve shown in FIG. 35. Accordingly, the electric current 11 from the electric power source 20 does not flow in the duct; no driving force is generated. As the result, overcooling of the liquid metal in the reactor vessel 31 is avoided.

For the tenth and the thirteenth embodiments, the duct plates 52 are covered on its inner surface with electric insulating material 64, so that the current 11 is prevented from leaking to other regions and from not perpendicularly intersecting the magnetic field 8, to allow the electric current 11 to be used with a high efficiency.

For the eleventh and the twelfth embodiments, it is preferable to apply the electric insulating treatment to the inlet 61 and the outlet 46 to prevent the loop-like current 11 from leaking to other directions than the loop direction.

As can be seen from the above description, each embodiment of the invention uses the common principle described below. A flow path for liquid metal is located where an electric current 11 perpendicularly intersects a magnetic field, while perpendicularly intersecting both the electric current and the magnetic field. The intensities of the electric current 11 and/or the magnetic field 8 vary with the temperature of the liquid metal. The interaction between the electric current 11 and the magnetic field 8 allows a force to be produced to act on the liquid metal flow to control it. This force may be the driving force P to accelerate the flow as described in the tenth and the thirteenth embodiments, or may be the braking force F as described in the other embodiments. Both of the driving force P and the braking force F are caused by the interaction between the electric current 11 and the magnetic field 8.

This invention uses no mechanically movable parts for controlling the flow, providing the controlling apparatus with high reliability.

While the described embodiments represent the preferred froms of the present invention, it is to be understood that modifications will occur to those skilled in that art without departing from the spirit of the invention. The scope of the invention is therefore to be determined solely by the appended claims.

What is claimed is:

1. A method of controlling a flow of liquid metal comprising the steps of:
   generating a magnetic fied along a first direction;
   generating an electric current flow along a second direction;
   causing liquid metal to flow in a third direction, said magnetic field electric current flow and liquid metal flow all intersecting perpendicularly to one another; and
   varying at least one of the magnetic field and the electric current flow intensity in response to a change of temperature of the liquid metal by a member positioned in the middle of one of said paths to cause a change in the intensity of one of the magnetic field and electric current, so that force acting on the liquid metal is increased or decreased.

2. A method of controlling a flow of liquid metal according to claim 1, wherein both of the magnetic field and the electric current are varied in intensity in response to the temperature of the liquid metal.

3. A method of controlling a flow of liquid metal comprising the steps of:
   generating a magnetic field along a first direction;
   generating an electric current flow along a second direction;
   causing liquid metal to flow in a third direction, said magnetic field electric current flow and liquid metal flow all intersecting perpendicularly to one another;
   providing a material which varies in electric property with temperature of said liquid metal;
   transferring temperature of the liquid metal to said material; and
   allowing at least one of the magnetic field and the electric current to pass through said material, so that the intensity of said one is varied so that force acting on the liquid metal is increased or decreased.

4. An apparatus for controlling a flow of liquid metal comprising:
   a flow path means for liquid metal located where a magnetic field and an electric current intersect perpendicularly to each other, while the flow path means for liquid metal perpendicularly intersects both the magnetic field and the electric current;
   means for generating the magnetic field; and
   material varying in electric property with a temperature of the liquid metal and installed in at least one of the path of the magnetic field, a path of the electric current and the means for generating the magnetic field.

5. An apparatus for controlling a flow of liquid metal according to claim 4, wherein the flow path means for liquid metal is surrounded by facing electrodes defining one of a vertical distance and a horizontal distance and by facing electric insultating walls defining the other of the same, and the electric insulating walls are provided therein with electric resistor means which varies in electric resistance with temperature and which is connected to an electric circuit connecting the electrodes.

6. An apparatus for controlling a flow of liquid metal according to claim 4, wherein the flow path means for liquid metal is surrounded all around by duct means made of electrically conductive material, inner surfaces of the duct means are provided in either the vertical or the horizontal direction with electric resistor means which varies in electric resistance with temperature, and magnet means is installed outside of the wall of the duct means in said one of the directions.

7. An apparatus for controlling a flow of liquid metal according to claim 4, wherein the flow path means for liquid metal is surrounded by facing electrodes defining one of a vertical distance and a horizontal distance and by facing magnets defining the other of the same, and coil means is connected to the electrodes and wound around the magnets.

8. An apparatus for controlling a flow of liquid metal according to claim 4, wherein the flow path means for liquid metal is surrounded by facing electrodes defining one of a vertical distance and a horizontal distance and by facing electric insulating walls defining the other of the same, and outside of the electric insulating walls are installed magnets made of material which varies in coercive force with temperature and varies in electric resistance with temperature, the coercive force-temperature characteristic having a tendency opposite to that of the electric resistance-temperature characteristic and the magnets being in electric contact with the electrodes.

9. An apparatus for controlling a flow of liquid metal according to claim 4, wherein the flow path means for liquid metal is surrounded by facing magnets defining one of a vertical distance and a horizontal distance and by facing electric resistors defining the other of the same, the electric resistors varying in electric resistance with temperature, electrodes are installed outside of and in contact with the electric resistors, and an electric power source is connected to an electric circuit connecting the electrodes.

10. An apparatus for controlling a flow of liquid metal according to claim 4, wherein the flow path means for liquid metal is constituted by an inner cylinder and an outer cylinder surrounding an upper portion of the inner cylinder, the inner cylinder is provided therein with heat-transfer pipe means which is connected to air cooler means and passing through horizontal partition means in a reactor vessel of a fast breeder reactor, the outer cylinder is provided with magnet means facing the inner cylinder, and between the magnet means and the inner cylinder is installed electric resistor means which varies in electric resistance with temperature.

11. An apparatus for controlling a flow of liquid metal according to claim 4, wherein the flow path means for liquid metal is constituted by a cylinder provided therein with heat-transfer pipe means which is extended from pipe line means connected to air cooler means and passing through horizontal partition means in a reactor vessel of a fast breeder reactor, magnet means is installed at a center of an outlet of a lower end of the inner cylinder, and between the magnet means and an inner surface of the outlet is installed electric resistor means which varies in electric resistance with temperature.

12. An apparatus for controlling a flow of liquid metal according to claim 4, wherein the liquid metal is liquid metal flowing in pipe line means which connects air cooler means and heat-transfer pipe means installed in a heat exchanger in a reactor vessel of a fast breeder reactor, the liquid metal is surrounded by facing electric resistors defining one of a vertical distance and a horizontal distance and by facing magnets defining the other of the same, the electric resistors varying in electric resistance with temperature, electrodes are installed outside of the electric resistors, and electric power source means is connected to the electric circuit connecting the electrodes.

13. An apparatus for controlling a flow of liquid metal comprising:
a flow path means for liquid metal located where a magnetic field and an electric current intersect perpendicularly to each other, while the flow path means for liquid metal perpendicularly intersects both the magnetic field and the electric current;
means for generating the magnetic field; and
material varying in electric property with a change in temperature of the liquid metal and installed in a path of the electric current wherein the flow path means is for controlling the rate of liquid metal flow and is provided at a center of a cross section of the liquid metal path with one of magnetic substance and magnetic means, having an annular section surrounded by the other of the same, said one of said magnetic substance and said magnetic means being provided with electric resistor means which extends radially in the annular section and varies in electric resistance with temperature.

14. A device for controlling flow of a liquid metal which comprises a flow path for flowing a liquid metal therethrough and a means for generating a magnetic field crossing the direction of said flow at right angles in said liquid metal, the flow rate of said liquid metal being controlled through mutual action between an electric current and said magnetic field generated in said fluid, wherein said device further comprises a material whose electrical resistance varies with the temperature of said liquid metal, said material being provided to influence the effectiveness of at least one of said current and said means for generating a magnetic field for controlling the liquid metal flow.

* * * * *